(12) United States Patent
Attee (10) Patent No.: US 6,988,696 B2
(45) Date of Patent: Jan. 24, 2006

(54) MOUNTING MEMBER WITH SNAP IN SWIVEL MEMBER

(75) Inventor: Keith S. Attee, Charlevoix, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 67 days.

(21) Appl. No.: 10/453,741

(22) Filed: Jun. 3, 2003

(65) Prior Publication Data

US 2004/0245416 A1 Dec. 9, 2004

(51) Int. Cl.
F21V 35/00 (2006.01)

(52) U.S. Cl. ...................................... 248/214
(58) Field of Classification Search ............ 248/229.17, 248/214, 74.4, 68.1, 288.31, 74.1, 230.1, 248/230.8, 315, 316.1; 294/88; 269/75, 277, 269/282

See application file for complete search history.

(56) References Cited

U.S. PATENT DOCUMENTS

| | | | |
|---|---|---|---|
| 229,670 A | 7/1880 | Carrick | 384/273 |
| 294,736 A | 3/1884 | Hyle | 269/279 |
| 320,436 A | 6/1885 | Hock | 15/144.2 |
| 377,114 A | 1/1888 | Pague | 211/64 |
| 490,150 A | 1/1893 | Low | 269/89 |
| 659,532 A | 10/1900 | Jordan | 108/8 |
| 688,230 A | 12/1901 | Isgrig et al. | 248/316 |
| 746,360 A | 12/1903 | McAdams | 285/146.2 |
| 1,468,110 A | 9/1923 | Howe | 296/95.1 |
| 1,472,566 A | 10/1923 | Oishei | 248/481 |
| 1,494,033 A | 5/1924 | Stevens | 359/602 |
| 1,543,037 A | 6/1925 | Teeter | 403/56 |
| 1,590,227 A | 6/1926 | Britton | 248/103 |
| 1,929,361 A | 10/1933 | Liljebladh | 271/106 |
| 1,929,807 A | 10/1933 | Csaper | 74/17 |
| 1,940,258 A | 12/1933 | Lautz | 29/84 |
| 1,955,226 A | 4/1934 | Chavannes | 309/20 |
| 1,986,149 A | 1/1935 | Harris | 280/33.1 |
| 1,987,987 A | 1/1935 | Bohmbach | 101/30 |
| 2,081,749 A | 5/1937 | Kritzler et al. | 309/16 |
| 2,141,945 A | 12/1938 | Tweedale | 103/162 |
| 2,168,988 A | 8/1939 | Hultquist | 248/181 |
| 2,188,514 A | 1/1940 | Moore | 248/181 |
| 2,198,623 A | 4/1940 | Kastler | 309/16 |
| 2,212,156 A | 8/1940 | Erdley | 24/81 |

(Continued)

OTHER PUBLICATIONS

Exhibit A—1994 BTM Catalog (16 pages).
Exhibit B—1989 CPI Catalog (2 pages).
Exhibit C—1993 ISI Double Rod Mount Drawing (1 page).
Exhibit D—1993 ISI Catalog (3 pages).

Primary Examiner—Leslie A. Braun
Assistant Examiner—Kofi Schulterbrandt
(74) Attorney, Agent, or Firm—Van Dyke, Gardner, Linn & Burkhart, LLP (57) ABSTRACT

A mounting assembly for pivotally mounting a workpiece holder to a support structure includes a mounting member having an opening at least partially therethrough and a swivel member. The swivel member has a generally cylindrical passageway therethrough for at least partially receiving a support structure. The swivel member defines a truncated, generally spherical shaped swivel member having a curved outer surface for engaging an inner surface of the opening of the mounting member. The swivel member includes a reduced diameter or chamfered portion at the outer surface to facilitate insertion of the swivel member into the opening of the mounting member, whereby the swivel member is substantially retained within the opening after insertion therein. The mounting member may be a mounting bracket for adjustably mounting to a workpiece holder or may be a mounting block which is attachable to a workpiece holder.

23 Claims, 3 Drawing Sheets

U.S. PATENT DOCUMENTS

| | | | | |
|---|---|---|---|---|
| 2,212,953 A | 8/1940 | Popp et al. ................... 88/40 |
| 2,295,051 A | 9/1942 | Roth ........................... 24/81 |
| 2,326,962 A | 8/1943 | Meier .......................... 294/118 |
| 2,381,657 A | 8/1945 | Eksergian et al. ............ 294/88 |
| 2,452,406 A | 10/1948 | Volkery et al. ............... 24/81 |
| 2,469,542 A | 5/1949 | Becker ......................... 24/81 |
| 2,499,136 A | 2/1950 | Edlund et al. ................ 296/85 |
| 2,565,793 A | 8/1951 | Weismantel ................. 248/362 |
| 2,651,026 A | 9/1953 | Roth ........................... 339/246 |
| 2,769,895 A | 11/1956 | Boord .......................... 240/6.41 |
| 2,770,983 A | 11/1956 | Hatala ......................... 74/553 |
| 2,776,168 A | 1/1957 | Schweda ..................... 299/73 |
| 2,791,623 A | 5/1957 | Lock et al. ................... 174/94 |
| 2,825,601 A | 3/1958 | Doty ........................... 296/97 |
| 2,853,905 A | 9/1958 | Reisacher et al. ............ 72/238 |
| 2,858,522 A | 10/1958 | Wengen et al. .............. 339/264 |
| 3,055,398 A | 9/1962 | Tunnessen ................... 138/111 |
| 3,139,296 A | 6/1964 | Greene ........................ 287/52 |
| 3,146,982 A | 9/1964 | Budnick ....................... 248/68 |
| RE26,011 E | 5/1966 | Girard ......................... 248/68 |
| 3,281,170 A | 10/1966 | Kaplan ........................ 287/111 |
| 3,349,927 A | 10/1967 | Blatt ........................... 414/627 |
| 3,350,132 A | 10/1967 | Ashton ........................ 294/88 |
| 3,482,830 A | 12/1969 | Sendoykas ................... 269/32 |
| 3,519,188 A | 7/1970 | Erhardt, Jr. .................. 227/144 |
| 3,539,234 A * | 11/1970 | Rapata ......................... 384/203 |
| 3,568,959 A | 3/1971 | Blatt ........................... 294/64 |
| 3,613,904 A | 10/1971 | Blatt ........................... 214/1 BV |
| 3,635,514 A | 1/1972 | Blatt ........................... 294/106 |
| 3,664,654 A | 5/1972 | Manville ...................... 269/9 |
| 3,677,584 A | 7/1972 | Short .......................... 287/49 |
| 3,712,415 A | 1/1973 | Blatt et al. ................... 181/60 |
| 3,759,563 A | 9/1973 | Kitamura ..................... 294/88 |
| D230,826 S | 3/1974 | Menshen ..................... D8/230 |
| 3,920,295 A | 11/1975 | Speckin ....................... 312/108 |
| 3,934,915 A | 1/1976 | Humpa ........................ 294/16 |
| 3,975,068 A | 8/1976 | Speckin ....................... 312/254 |
| 4,036,289 A | 7/1977 | Cheng et al. ................. 165/82 |
| 4,072,236 A | 2/1978 | Nomura et al. ............... 214/1 |
| 4,234,223 A | 11/1980 | O'Neil ......................... 294/88 |
| 4,270,250 A | 6/1981 | Schon ......................... 24/263 |
| 4,275,872 A | 6/1981 | Mullis ......................... 269/72 |
| 4,307,864 A | 12/1981 | Benoit ......................... 248/221.3 |
| 4,355,922 A | 10/1982 | Sato ............................ 403/285 |
| 4,365,928 A | 12/1982 | Baily .......................... 414/735 |
| 4,382,572 A | 5/1983 | Thompson ................... 248/484 |
| 4,403,801 A | 9/1983 | Huff et al. .................... 294/93 |
| 4,453,755 A | 6/1984 | Blatt et al. ................... 294/64 |
| 4,473,249 A | 9/1984 | Valentine et al. ............. 294/88 |
| 4,475,607 A | 10/1984 | Haney ......................... 175/422 |
| 4,480,497 A | 11/1984 | Locher ........................ 74/531 |
| 4,495,834 A | 1/1985 | Bauer et al. .................. 74/493 |
| 4,515,336 A | 5/1985 | Fischer ....................... 248/288.3 |
| 4,519,279 A | 5/1985 | Ruggeri ....................... 82/38 |
| 4,529,182 A | 7/1985 | Valentine ..................... 259/34 |
| 4,596,415 A | 6/1986 | Blatt ........................... 294/88 |
| 4,610,475 A | 9/1986 | Heiserman ................... 294/86.4 |
| 4,626,014 A | 12/1986 | Vredenbregt et al. ......... 294/88 |
| 4,650,237 A | 3/1987 | Lessway ...................... 294/119.1 |
| 4,703,968 A | 11/1987 | LaBounty ..................... 294/88 |
| 4,708,297 A | 11/1987 | Boers .......................... 242/7.05 |
| D296,546 S | 7/1988 | Sachs .......................... D13/13 |
| 4,805,938 A | 2/1989 | Redmond et al. ............ 280/47.35 |
| 4,821,719 A | 4/1989 | Fogarty ....................... 128/325 |
| 4,886,635 A | 12/1989 | Forster et al. ................ 376/268 |
| 4,941,481 A | 7/1990 | Wagenknecht ............... 606/59 |
| 4,957,318 A | 9/1990 | Blatt ........................... 294/64.1 |
| 5,016,850 A | 5/1991 | Plahn .......................... 248/206.3 |
| 5,062,756 A | 11/1991 | McArthur et al. ............ 414/22.51 |
| 5,069,433 A | 12/1991 | Womack ...................... 269/277 |
| 5,085,480 A | 2/1992 | Jackson ....................... 294/116 |
| 5,123,547 A | 6/1992 | Koch .......................... 211/59.4 |
| 5,125,632 A | 6/1992 | Blatt et al. ................... 269/32 |
| 5,125,709 A | 6/1992 | Meier, Jr. .................... 294/119.1 |
| 5,143,359 A | 9/1992 | Bush ........................... 269/6 |
| RE34,120 E | 11/1992 | Plahn .......................... 248/206.3 |
| 5,192,058 A | 3/1993 | VanDalsem et al. .......... 269/24 |
| 5,222,854 A | 6/1993 | Blatt et al. ................... 414/225 |
| 5,248,177 A | 9/1993 | Jones et al. .................. 294/88 |
| 5,261,715 A | 11/1993 | Blatt et al. ................... 294/88 |
| 5,271,651 A * | 12/1993 | Blatt et al. ................... 294/88 |
| 5,280,981 A | 1/1994 | Schulz ........................ 294/106 |
| 5,284,375 A | 2/1994 | Land, III ..................... 294/88 |
| 5,291,914 A | 3/1994 | Bares et al. .................. 137/15 |
| 5,299,847 A * | 4/1994 | Blatt et al. ................... 294/88 |
| 5,306,096 A | 4/1994 | Tuns et al. ................... 403/344 |
| 5,377,939 A | 1/1995 | Kirma ......................... 248/68.1 |
| 5,452,981 A | 9/1995 | Crorey et al. ................ 414/225 |
| 5,492,443 A | 2/1996 | Crorey et al. ................ 414/744.5 |
| 5,503,378 A | 4/1996 | Schauss et al. ............... 269/32 |
| 5,516,173 A | 5/1996 | Sawdon ....................... 294/86.4 |
| 5,536,133 A | 7/1996 | Velez et al. .................. 414/620 |
| 5,588,688 A | 12/1996 | Jacobsen et al. ............. 294/106 |
| 5,632,588 A | 5/1997 | Crorey et al. ................ 414/225 |
| 5,647,625 A * | 7/1997 | Sawdon ....................... 294/86.4 |
| 5,660,363 A | 8/1997 | Maglica ....................... 248/288.31 |
| 5,851,084 A | 12/1998 | Nishikawa ................... 403/344 |
| 5,938,259 A | 8/1999 | Sawdon et al. ............... 294/116 |
| 5,941,513 A * | 8/1999 | Moilanen et al. ............ 269/32 |
| 5,992,802 A | 11/1999 | Campbell .................... 248/68.1 |
| 6,099,539 A | 8/2000 | Howell et al. ................ 606/151 |
| 6,575,512 B2 | 6/2003 | Moilanen et al. ............. 294/88 |
| 6,578,801 B2 | 6/2003 | Attee .......................... 248/74.4 |
| 2003/0116985 A1 | 6/2003 | Moilanen et al. ............. 294/88 |

* cited by examiner

MOUNTING MEMBER WITH SNAP IN SWIVEL MEMBER

FIELD OF THE INVENTION

The present invention relates generally to mounting members or brackets for a gripper or other workpiece holder and, more particularly, to a mounting member or bracket which may receive or attach to a gripper or workpiece holder and which is adjustably mountable to a rod or support structure.

BACKGROUND OF THE INVENTION

Mounting brackets or blocks for mounting a gripper or workpiece holder or the like to a support structure are well known in the art. The mounting brackets engage a cylindrical portion of the gripper and mount to a cylindrical support rod or arm. Some mounting blocks or the like may attach to a portion of the gripper, such as a rear plate or portion of the gripper. Such grippers or workpiece holders are typically implemented at assembly lines or other industrial applications and connected to support structures along the assembly line or machines.

In order to provide pivotable adjustment of the gripper relative to the bracket, while further providing pivotable or rotational adjustment of the bracket relative to the support structure, mounting brackets have been proposed which provide a cylindrical opening at one end for receiving the gripper therethrough and a second opening at the other end of the bracket. A partial spherical collar may be rotatably received in the second opening and may slidably receive a support rod or post. One known mounting bracket design provides a two piece mounting bracket or plate which is secured together by three fasteners, whereby the two plates define both of the openings therebetween. Accordingly, in order to insert the partial spherical collar into the opening of the bracket and/or in order to adjust the position of the support structure and the gripper with respect to the bracket, at least two, and maybe all three, of the fasteners must be loosened to loosen the clamping forces at both the support structure and the gripper.

Another proposed bracket which provides rotational adjustment with respect to the support post and pivotal adjustment of the gripper with respect to the bracket provides a one piece mounting bracket which defines a pair of openings which are adjustable via a single fastener. However, loosening of the fastener results in loosening of both the gripper and the support post. Also, during assembly of the bracket, the fastener must be substantially loosened and the bracket may have to be pried apart to sufficiently enlarge the opening to receive a swivel member therein for providing adjustable or pivotable attachment of the bracket to a support structure or post.

Therefore, there is a need in the art for a mounting member or bracket which overcomes the shortcomings of the prior art.

SUMMARY OF THE INVENTION

The present invention is intended to provide a snap in ball member or swivel member for a gripper or workpiece holder mounting bracket or a rear mounting block for a gripper or workpiece holder. The bracket or mounting block may have an opening therethrough which receives the swivel member. The swivel member may have a chamfered portion or tapered edge which allows the ball member to roll or snap into the opening of the bracket or mounting block. The bracket may pivotally receive a gripper through one opening in the bracket and pivotally or rotatably mount the bracket and gripper to a support structure at the swivel member at another opening in the bracket. The mounting bracket or block may be a single piece or unitary bracket or block, which may have a fastener at each opening for adjusting a clamping force at each opening of the bracket or block.

According to an aspect of the present invention, a mounting assembly for adjustably receiving a support structure includes a mounting member and a swivel member. The mounting member has an opening at least partially therethrough which defines an inner surface. The swivel member comprises a truncated generally spherical shaped swivel member having a curved outer surface for engaging the inner surface of the opening of the mounting member. The swivel member has a passageway therethrough, such as a generally cylindrical passageway, for at least partially receiving the support structure. The outer surface of the swivel member includes a reduced diameter portion or chamfered portion to facilitate insertion of the swivel member into the opening of the mounting member, whereby the inner surface of the opening is configured to substantially retain the swivel member within the opening after insertion of the swivel member into the opening.

The swivel member may define a split member with a gap extending therealong. The reduced diameter portion or chamfered portion may be located generally along and adjacent to the gap. The mounting member may define a second gap at the opening, with a diameter and clamping force of the opening being adjustable via compression and expansion of the second gap. The mounting assembly may include an adjustable fastener generally at the opening. The fastener may be adjustable to adjust a clamping force of the swivel member on the support structure received at least partially through the passageway via expansion or compression of the gap of the swivel member and the second gap of the mounting member.

The swivel member may include a plurality of grooves extending along the outer surface, whereby the grooves enhance gripping of the swivel member within the opening. The inner surface of the opening in the mounting member may have a curved surface having an arcuate cross section for generally uniformly engaging the outer surface of the swivel member when the swivel member is inserted into the opening. The mounting member may include a beveled portion around the opening.

In one form, the mounting member may comprise a mounting bracket for mounting a workpiece holder to a support structure. The mounting member may define a second opening for at least partially receiving a mounting portion of the workpiece holder. The mounting member may comprise a unitarily formed mounting member. The mounting member may define a first gap at the opening for the swivel member and a second gap at the second opening. The clamping forces at the openings may be independently adjustable via compression and expansion of the respective gaps.

In another form, the mounting member may comprise a rear mounting block for a workpiece holder and may be configured to mount to a portion of the workpiece holder. The mounting member may comprise a base portion which is securable to the workpiece holder and a support structure receiving portion for pivotally receiving the swivel member. The mounting member may comprise a unitarily formed mounting block. The mounting member may define a gap at the opening in the support structure receiving portion, such that a clamping force at the opening may be adjustable via compression and expansion of the gap. The mounting member may define a second gap partially between the base portion and the support structure receiving portion to allow for flexing of the support structure receiving portion relative to the base portion.

Therefore, the present invention provides a snap in swivel member suitable for use with a unitary gripper or workpiece holder mounting bracket or a rear mounting block for a workpiece holder or other types of mounting brackets or mounting blocks. The swivel member may allow for pivotable and rotational adjustment of the mounting bracket or block or the like with respect to a generally fixed support structure or rod or post or the like. Adjustment of the support structure or post and/or the swivel member within the opening in the mounting bracket or block may be performed via adjustment of a single fastener. The lateral dimensions of the unitary bracket of the present invention, and thus the material required to make the bracket, may be reduced over the prior art, since each fastener is positioned generally adjacent to the respective opening in the bracket and does not extend laterally outwardly of an outermost diameter of the bracket at which the bracket engages and retains the gripper assembly. Because the bracket or mounting block of the present invention may be a unitarily formed bracket or block, manufacturing and assembly processes of the bracket or block may be reduced.

These and other objects, purposes, advantages and features of the present invention will become apparent upon review of the following specification in conjunction with the drawings.

DESCRIPTION OF THE PREFERRED EMBODIMENTS

Figure 1:
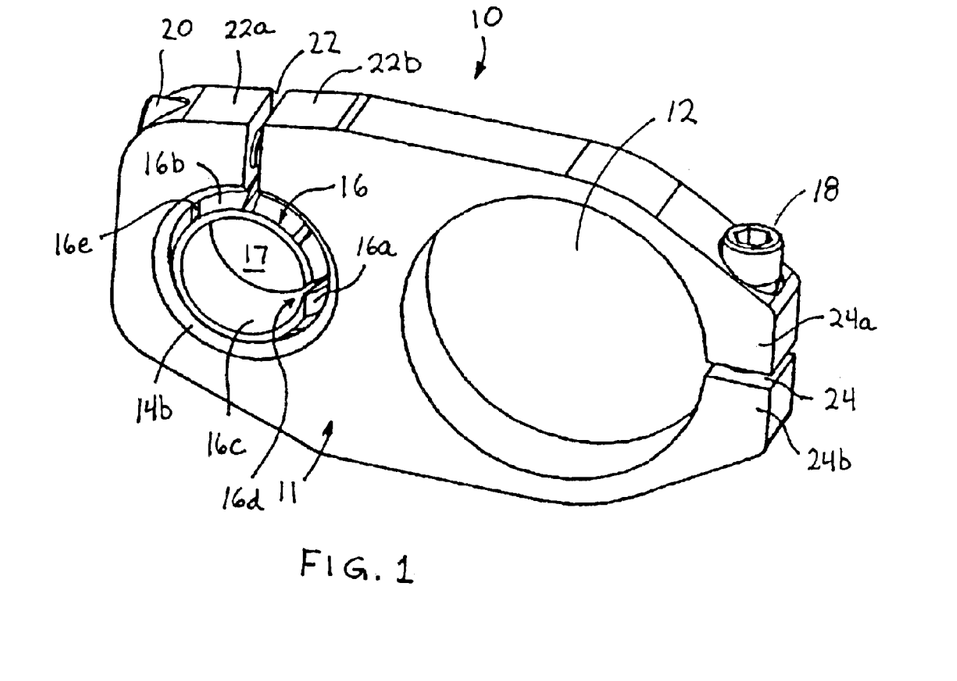
FIG. 1 is a perspective view of a mounting bracket assembly in accordance with the present invention.
Figure 2:
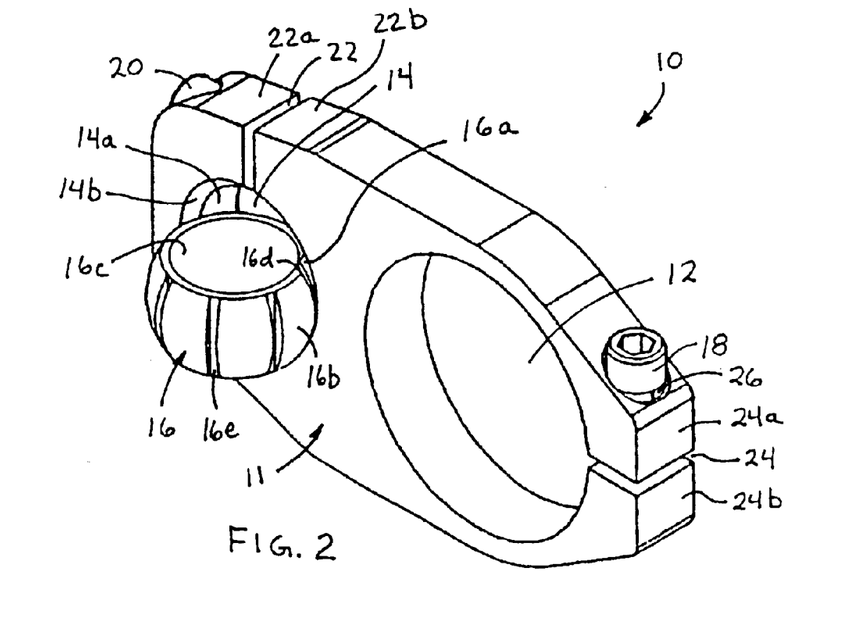
FIG. 2 is another perspective view of the mounting bracket assembly of FIG. 1, with the swivel member partially inserted into the respective opening in the bracket.

Referring now to the drawings and the illustrative embodiments depicted therein, a gripper or workpiece holder mounting bracket assembly 10 is adapted to mount a workpiece holder (not shown), such as a gripper or other holder or tool or the like, to a support structure (also not shown), such as a generally cylindrical rod or post, or other elongated, generally cylindrical support member (FIGS. 1 and 2). Mounting bracket assembly 10 includes a unitary bracket member 11, which defines a generally circular opening 12, which may pivotally receive the workpiece holder. Bracket member 11 also defines a second, generally circular opening 14 (FIGS. 2, 3 and 5) for adjustably receiving a donut swivel or swivel member or ring 16, which may receive the support structure or rod therethrough. A fastener 18 is provided at the opening 12 and may be adjustable to adjust a clamping force at opening 12, while a second fastener 20 is provided at opening 14 to adjust a clamping force at opening 14, as discussed below. Bracket member 11 may be a unitary or unitarily formed bracket to ease manufacturing and assembly of the bracket and to ease adjustment of the fasteners and of the bracket relative to the workpiece holder and support structure. Because the bracket member may be a one piece structure, the swivel member 16 may include a tapered or chamfered or narrowed diameter portion 16a (FIGS. 1, 2 and 4) to facilitate assembly of the swivel member 16 to bracket member 11, as also discussed below.

Circular opening 12 functions to secure the gripper or workpiece holder assembly therein when fastener 18 is tightened, while providing adjustment of the gripper assembly relative to mounting bracket 11 when fastener 18 is loosened. The workpiece holder may be rotatably secured at a cylindrical portion of the workpiece holder, which may be at a reduced diameter region, or at an outer circumference of the workpiece holder body. The workpiece holder may be a gripper of the type disclosed in commonly assigned, U.S. Pat. No. 6,361,095 for ADJUSTABLE STROKE GRIPPER ASSEMBLY (Attorney Docket CPI01 P-309), the disclosure of which is hereby incorporated herein by reference, or may be any known gripper, workpiece holder or other tool, holders or the like, such as conventional gripper assemblies or the like, without affecting the scope of the present invention.

Figures 3, 4, 5:
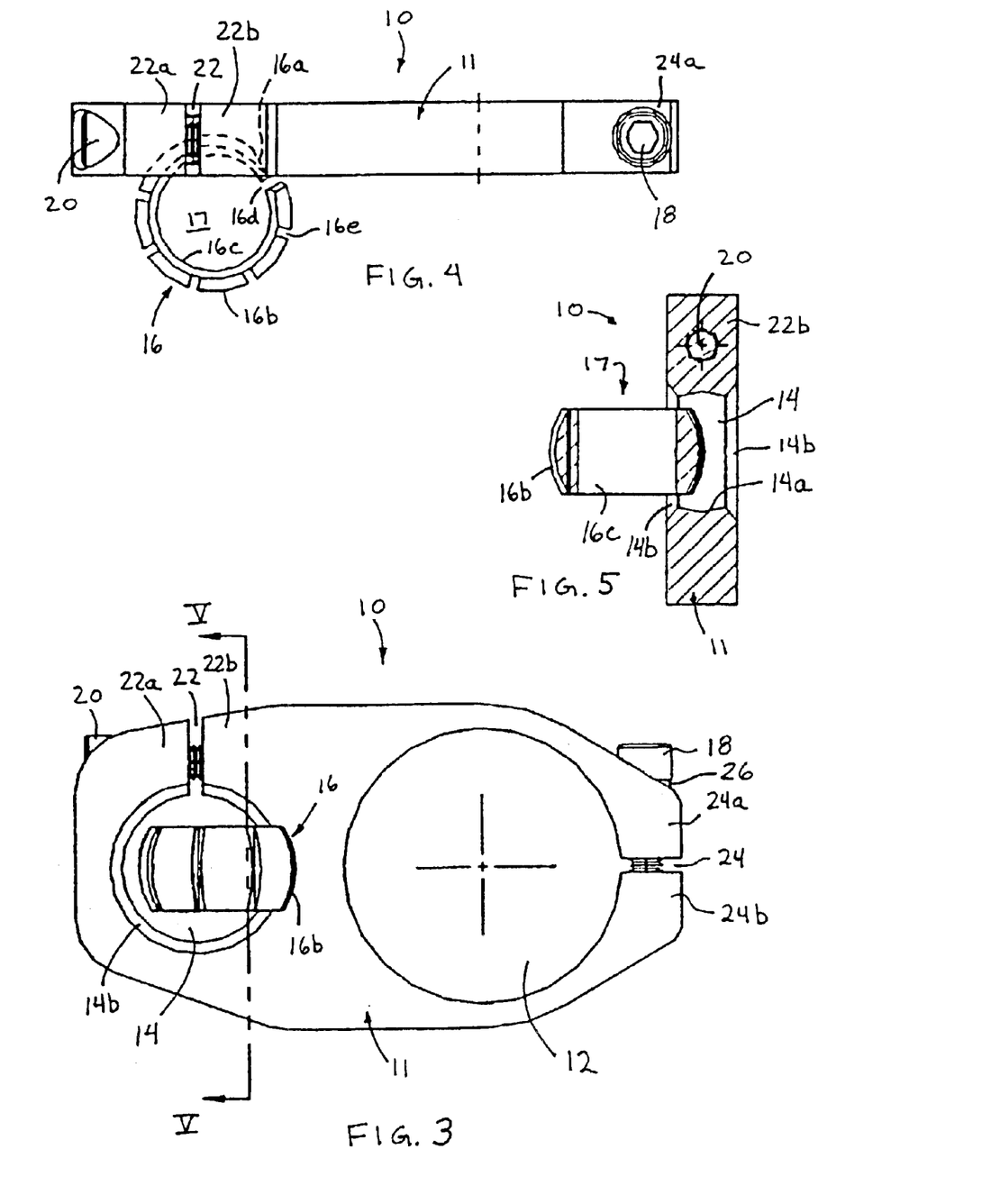
FIG. 3 is a side elevation of the mounting bracket assembly of FIG. 2.
FIG. 4 is a plan view of the mounting bracket assembly of FIGS. 2 and 3.
FIG. 5 is a sectional view of the mounting bracket assembly taken along the line V-V in FIG. 3.

Opening 14 has an arcuate cross-section, as shown in FIG. 5, and functions to pivotally and rotatably receive and retain swivel member 16 therein. The arcuate cross section of opening 14 defines a curved surface 14a for engagement with an outer, correspondingly curved surface 16b of swivel member 16. Swivel member 16 slidably mates and swivels within the opening 14 via generally uniform engagement of outer surface 16b with inner curved surface 14a of opening 14. Swivel member 16 thus is adjustably or pivotally received within the opening 14 and provides a generally cylindrical passageway 17 therethrough which is adapted to slidably receive a generally cylindrical rod or post or support for adjustably mounting the bracket to the post. Swivel member 16 thus forms a pivot or swivel collar on a conventional mounting rod or post. Bracket 11 may include a beveled portion 14b along one or both faces or surfaces at one or both sides of mounting bracket 11, to increase the pivotal movement of mounting bracket 11 relative to the support structure, as discussed below.

Swivel member or donut swivel 16 is a truncated generally spherical member, which includes outer, curved or partially spherical surface 16b and an inner, annular surface 16c which defines the generally cylindrical passageway 17 through swivel member 16. Swivel member 16 may be a split ring having a gap or slot 16d extending along swivel member 16 to allow flexing of swivel member 16 to decrease or increase the diameter of the passageway 17 via compression or expansion of gap 16d. This allows swivel member 16 to tighten its grip on the support structure as swivel member 16 is compressed within opening 14, as discussed below. Swivel member 16 may also include a plurality of notches or grooves 16e extending along its outer surface 16b which function to enhance gripping of swivel member 16 at arcuate or concave inner surface 14a of opening 14.

Swivel member 16 is configured to be snapped or rolled into opening 14 of mounting bracket 11. As shown in FIGS.

1, 2 and 4, swivel member 16 includes chamfered or tapered portion 16a at one side of gap 16d. Chamfered portion 16a facilitates insertion of swivel member 16 into opening 14 without having to pry the opening apart or open to receive swivel member 16 therein. As best shown in FIG. 4, swivel member 16 may be positioned partially within opening 14, such that chamfered portion 16a is positioned generally within opening 14 and engages the inner surface 14a of opening 14 inward or adjacent to the beveled portion 14b around opening 14. Swivel member 16 may then be pressed or urged toward and into opening 14 and thus may be pivoted about the contact area of chamfered portion 16a and inner surface 14a of opening to roll or snap swivel member 16 into opening 14, whereby chamfered portion 16a provides a reduced diameter portion or swivel member 16, which allows swivel member 16 to fit into opening 14 of bracket member 11. When positioned within opening 14, outer surface 16b of swivel member 16 engages inner concave surface 14a of opening 14. Swivel member 16 may thus be pivoted within opening 14 until oriented such that the support structure or rod may insert into the generally cylindrical passageway 17 of swivel member 16. Inner curved surface 14a defines reduced diameter outer ends which function to retain swivel member 16 within opening 14, whereby swivel member 16 may swivel or pivot within opening 14, but will not readily move outward from opening 14.

Although described as defining a curved or arcuate opening 14 having concave or curved inner surface 14a, it is envisioned that the mounting bracket member may define an opening or passageway which is generally cylindrical and which is further defined by a plurality of ridges or ribs extending therearound at or towards the outer ends of the opening. The chamfered or narrowed diameter portion of the swivel member may engage one of the ribs during insertion of the swivel member in the manner described above. The ribs engage corresponding portions of the outer curved surface of the swivel member and retain the swivel member in the opening, while allowing for rotation and pivotal movement of the swivel member relative to the bracket, without affecting the scope of the present invention.

Mounting bracket 11 defines a gap 22 at opening 14 and a generally cylindrical bore through portions 22a, 22b of bracket 11 at either side of gap 22 for receiving fastener 20 therethrough. The outward portion 22a of bracket 11 may have a generally cylindrical bore, while the inward portion 22b may have a threaded bore for threadedly securing fastener 20 therein. Fastener 20 may be tightened or loosened within the bore in bracket portions 22a, 22b to adjust gap 22 and, thus, to adjust a clamping force on swivel member 16 within opening 14. Swivel member 16 may also flex to adjust a clamping force on the support structure or rod via expansion and contraction of gap 16d of swivel member 16 in response to adjustment of fastener 20 and gap 22 of mounting bracket 11.

Similarly, mounting bracket 11 also defines a second gap 24 at opening 12 and a generally cylindrical bore through portions 24a, 24b of bracket 11 at either side of gap 24 for receiving fastener 18 therethrough. One portion 24a of bracket 11 may have a generally cylindrical bore, while the other portion 24b may have a threaded bore for threadedly securing fastener 18 therein. Fastener 18 may be tightened or loosened within the bore in bracket portions 24a, 24b to adjust gap 24 and, thus, to adjust a clamping force on the workpiece holder positioned within or partially within opening 12. The cylindrical bores at bracket portions 22a, 24a may be countersunk at an outer end to allow the heads of fasteners 20, 18 to at least partially seat within the countersunk portion. The fasteners 20, 18 may include a lock washer 26 or the like to facilitate rotational movement of the fastener heads against bracket 11 and to substantially retain the fasteners in the desired position to retain the clamping force at the desired level for the respective opening.

Because bracket 11 may be unitarily formed or a unitary or one-piece bracket, the assembly processes of the bracket assembly may be reduced. After the bracket is formed or cast, the swivel member may be rolled or pressed or snapped into the opening in the bracket as described above, and the fasteners may be loosely threaded into their respective bores. No further assembly processes or positioning of multiple bracket components may be required to assemble the bracket assembly of the present invention.

During use of mounting bracket assembly 10, the workpiece holder may be positioned at least partially within opening 12 and may be at least initially pivotable therewithin, prior to tightening of fastener 18. Swivel member 16 is rolled or snapped into and positioned within opening 14 and is similarly at least initially pivotable therewithin prior to tightening of fastener 20. When fastener 18 is tightened, gap 24 may be compressed, which results in an increase in clamping force on the workpiece holder or the like positioned within opening 12. Likewise, as fastener 20 is tightened, gap 22 along bracket 11 may be compressed to increase the clamping force on swivel member 16 and thus on the support structure, in order to clamp and secure the support structure within and relative to bracket 11. The grooves 16e of swivel member 16 function to enhance gripping of swivel member 16 within opening 14 as fastener 20 is tightened in bracket 10. This reduces the torque requirement to get sufficient clamping of swivel member 16, and thus of the support structure or post, by bracket 11. Swivel member 16 may also or otherwise be roughened to further enhance gripping, as is known in the art, without affecting the scope of the present invention.

As best seen in FIG. 3, bracket 11 is formed such that the portion of bracket 11 that has the greatest width is generally at the larger circular opening 12 in bracket 11. Fastener 20 is received at the smaller opening 14 at a location that is laterally inward of the outermost portion of bracket 11, while fastener 18 is received and positioned in an orientation that is generally transverse to fastener 20 and that is also laterally inward of the outermost portion of bracket 11. Accordingly, the lateral dimensions of the bracket assembly may be reduced, and thus the material required to make the bracket may be reduced, because the fasteners are positioned and inset laterally inwardly of an outermost diameter of the bracket which engages and retains the workpiece holder or gripper.

Figure 6:
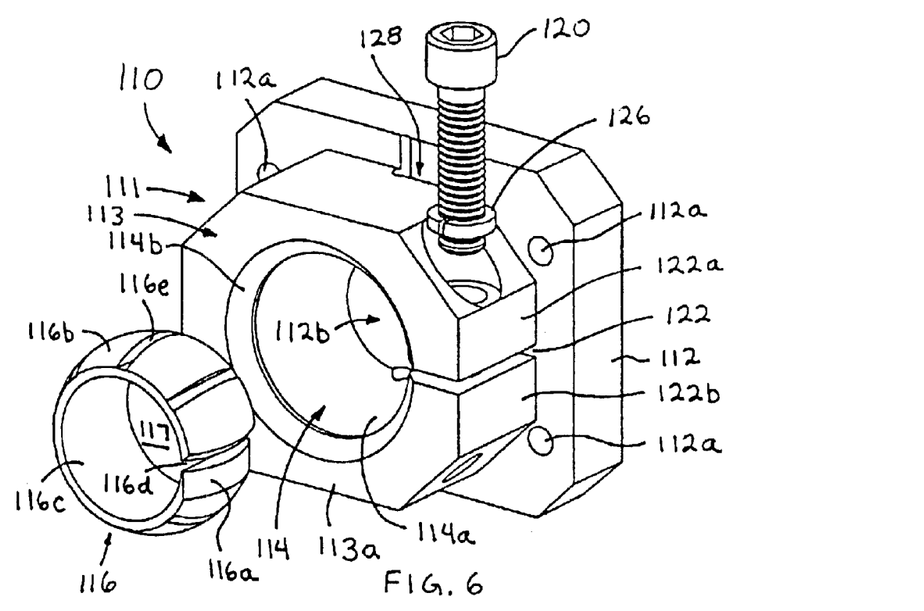
FIG. 6 is an exploded perspective view of a rear mounting block in accordance with the present invention.
Figure 7:
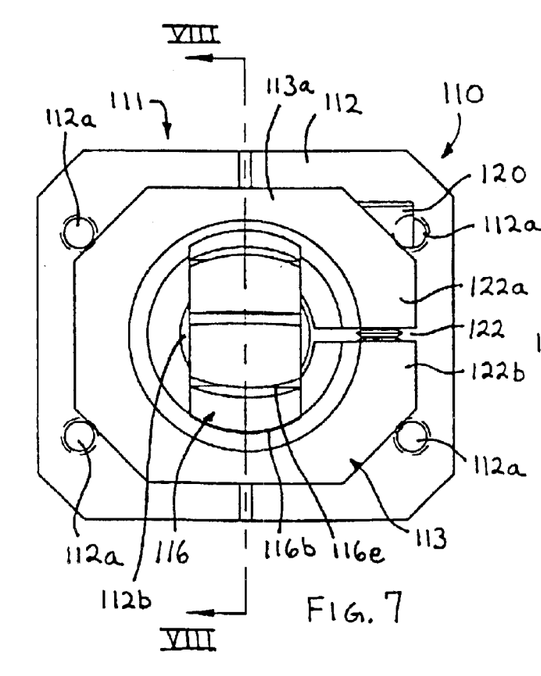
FIG. 7 is an end elevation of the rear mounting block of FIG. 6, with the swivel member partially inserted into the opening in the block.
Figure 8:
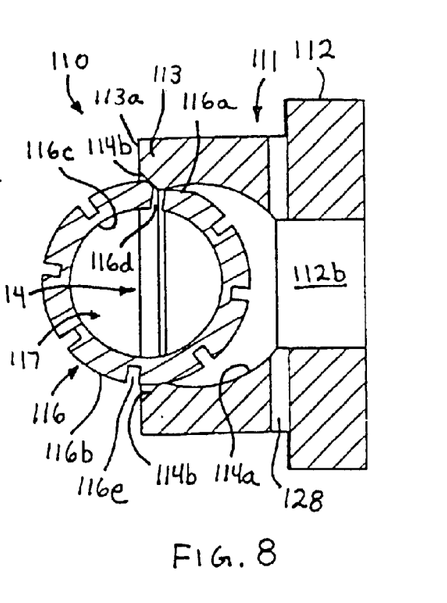
FIG. 8 is a sectional view of the rear mounting block taken along the line VIII-VIII in FIG. 7.

Referring now to FIGS. 6–8, a rear mounting assembly 110 for mounting a workpiece holder (not shown) to a support structure or rod or post (also not shown) includes a unitary mounting block 111. Mounting block 111 includes a base portion 112 and a support structure receiving portion 113 extending from base portion 112. Support structure receiving portion 113 defines a generally circular opening 114 for pivotally receiving a donut swivel or swivel member or ring 116, which may receive the support structure or rod therethrough. A fastener 120 is provided at support structure receiving portion 113 at or near opening 114 to adjust a clamping force at opening 114 via compression and expansion of a gap 122 in support structure receiving portion 113 of mounting block 111 at opening 114. Mounting block 111 may be a unitarily formed block to ease assembly of rear mounting block assembly 110 and to ease adjustment of fastener 120 and of mounting block 111 relative to the support structure. Because mounting block 111 may be a unitary or one piece structure, swivel member 116 includes a tapered or chamfered portion or narrowed diameter portion 116a to facilitate assembly of the swivel member 116 to mounting block 111, as discussed below.

Mounting block 111 is configured to mount to a portion of a workpiece holder or gripper, such as via fasteners or the like through mounting apertures 112a in base portion 112 of mounting block 111. The workpiece holder may be a gripper or any other type of holder or the like, such as a gripper of the type disclosed in commonly assigned, U.S. Pat. No. 6,361,095 for ADJUSTABLE STROKE GRIPPER ASSEMBLY, the disclosure of which is hereby incorporated herein by reference, or may be any known gripper, workpiece holder or other tool, holders or the like, such as conventional gripper assemblies or the like, without affecting the scope of the present invention.

Opening 114 has a partial spherical or arcuate cross-section, as shown in FIG. 8, and functions to pivotally and rotatably receive and retain swivel member 116 therein. The arcuate cross section of opening 114 defines a curved inner surface 114a for engagement with an outer, correspondingly curved surface 116b of swivel member 116. Swivel member 116 slidably mates and swivels within the opening 114. Swivel member 116 thus is pivotally received within opening 114 via generally uniform engagement of outer surface 116b with inner curved surface 114a of opening 114. Swivel member 116 provides a generally cylindrical passageway 117 therethrough which is adapted to slidably receive the cylindrical rod or post or support for movably mounting the bracket to the post. Swivel member 116 thus forms a collar on a conventional support rod or post. Support structure receiving portion 113 may include a beveled portion 114b along an outer face or surface 113a to increase the pivotal movement of mounting block 111 relative to the support structure.

Swivel member or donut swivel 116 is a truncated generally spherical member, which includes outer, curved or partially spherical surface 116b and an inner, annular surface 116c which defines the generally cylindrical passageway 117 through swivel member 116. Swivel member 116 may be a split ring having a gap or slot 116d extending along swivel member 116 to allow flexing of swivel member 116 to decrease or increase the diameter of the passageway 117 via compression or expansion of gap 116d. This allows swivel member 116 to tighten its grip on the support structure as swivel member 116 is compressed within opening 114. Swivel member 116 may also include a plurality of notches or grooves 116e extending along its outer surface 116b which function to enhance gripping of swivel member 116 at arcuate or concave inner surface 114a within opening 114.

Swivel member 116 is configured to be snapped or rolled into opening 114 of support structure receiving portion 113 of mounting block 111. As shown in FIGS. 6 and 8, swivel member 116 includes chamfered or tapered portion or reduced diameter portion 116a at and along one side of gap 116d. Chamfered portion 116a facilitates insertion of swivel member 116 into opening 114 without having to pry the opening open to receive swivel member 116 therein. As best shown in FIG. 8, swivel member 116 may be positioned partially within opening 114, such that chamfered portion 116a is at least partially within opening 114 and engages inner surface 114a of opening 114, such as adjacent to beveled portion 114b around opening 114. Swivel member 116 may then be pressed or urged toward and into opening 114 and thus may be pivoted about or rolled along the contact area of chamfered portion 116a and inner surface 114a to roll or snap swivel member 116 into opening 114, whereby chamfered portion 116a provides a reduced diameter portion of swivel member 116, such as at or near gap 116d, which allows swivel member 116 to roll and fit into opening 114 of support structure receiving portion 113 of mounting block 111. Base portion 112 of mounting block 111 may include an aperture 112b therethrough to provide clearance for swivel member 116 to be inserted generally sideways into support structure receiving portion 113 (as shown in FIGS. 7 and 8), and to provide clearance for an end of the support structure received at least partially through swivel member 116. When positioned within opening 114, outer surface 116b of swivel member 116 engages concave surface 114a of opening 114. Swivel member 116 may be pivoted within opening 114 until oriented such that the support structure or rod may insert into the generally cylindrical passageway 117 of swivel portion 116. Inner curved surface 114a defines reduced diameter outer ends which function to retain swivel member 116 within opening 114, whereby swivel member 116 may swivel or pivot within opening 114, but will not readily move outward from opening 114 of block 111.

Although shown and described as defining an opening 114 having a curved or arcuate or concave surface 114a, it is envisioned that the support structure receiving portion 113 of the mounting block may define an opening or passageway which is generally cylindrical and which is further defined by a plurality of ridges or ribs extending therearound at or towards the outer ends of the opening to engage corresponding portions of the outer curved surface of the swivel member, and to retain the swivel member in the opening while allowing for rotation and pivotal movement of the swivel member relative to the mounting block, without affecting the scope of the present invention.

Support structure receiving portion 113 of mounting block 111 defines gap 122 at opening 114 and a generally cylindrical bore through portions 122a, 122b at either side of gap 122 for receiving fastener 120 therethrough. One portion 122a of mounting block 111 may have a generally cylindrical bore, while the other portion 122b may have a threaded bore for threadedly securing fastener 120 therein. Fastener 120 may be tightened or loosened within the bores in portions 122a, 122b to adjust gap 122 and thus to adjust a clamping force on swivel member 116 within opening 114. As can be seen in FIGS. 6 and 8, mounting block 111 defines a slot or gap 128 between base portion 112 and support structure receiving portion 113 along a portion of support structure receiving portion 113 that defines gap 122. The separation gap 128 allows support structure receiving portion 113 to flex relative to base portion 112 and to expand or contract gap 122 in response to adjustment of fastener 120. Swivel member 116 may also flex to adjust a clamping force on the support structure or rod via expansion and contraction of gap 116d of swivel member 116 in response to adjustment of fastener 120 at support structure receiving portion 113 of mounting block 111. One of the block portions, such as portion 122a, may be countersunk at an outer end to allow the head of fastener 120 to at least partially seat within the countersunk portion. The fastener 120 may include a lock washer 126 or the like to facilitate rotational movement of the fastener head against the mounting block and to substantially retain the fastener in the desired position to retain the clamping force at the desired level at opening 114.

Because mounting block 111 may be unitarily formed or a unitary or one-piece block, the manufacturing and assembly processes of the mounting assembly may be reduced.

After the block is formed or cast, the separation gap between the base portion and the support structure receiving portion may be machined or cut. The swivel member may be rolled or pressed or snapped into the opening in the support structure receiving portion as described above, and the fastener may be loosely threaded into the threaded bore. No further assembly processes or positioning of multiple components may be required to assemble the mounting block assembly of the present invention.

During use of mounting block assembly 110, base portion 112 of mounting block 111 may be secured to a workpiece holder, such as via fasteners or the like. Swivel member 116 may be snapped into and positioned within opening 114 and may be at least initially pivotable therewithin prior to tightening of fastener 120. When fastener 120 is tightened, gap 122 along support structure receiving portion 113 may be compressed to increase the clamping force on swivel member 116 and thus on the support structure, in order to clamp and secure the support structure within and relative to mounting block 111 and the workpiece holder. The grooves 116e of swivel member 116 function to enhance gripping of swivel member 116 within opening 114 as fastener 120 is tightened in support structure receiving portion 113 of mounting block 111. This reduces the torque requirement to get sufficient clamping of swivel member 116, and thus of the support structure or post, by mounting block 111. Swivel member 116 may also or otherwise be roughened to further enhance gripping, as is known in the art, without affecting the scope of the present invention.

Although shown and described as being implemented with a unitary mounting bracket or mounting block, it is envisioned that the snap in swivel member of the present invention may be suitable for use in other brackets or mounting assemblies. For example, the snap in swivel member may be implemented with multiple piece bracket assemblies, such as the type disclosed in U.S. patent application Ser. No. 09/756,424, filed Jan. 8, 2001 by Attee for GRIPPER MOUNTING BRACKET, now U.S. Pat. No. 6,578,801, which is hereby incorporated herein by reference, or any other type of mounting bracket or rear mounting block or the like.

Therefore, the present invention provides a snap in swivel member suitable for use with a unitary gripper or workpiece holder mounting bracket or a rear mounting block for a workpiece holder, or with other types of brackets or mounting blocks. The snap in swivel member may be snapped into a fully assembled or unitary bracket or mounting block. The snap in swivel member of the present invention is thus particularly suited for use in unitary brackets and/or mounting blocks, such as described above, because the bracket or mounting block does not have to be assembled around the snap in swivel member. The swivel member may allow for pivotable and/or rotational adjustment of the mounting bracket or block or the like with respect to a generally fixed support structure or rod or post or the like. Adjustment of the support structure or post and/or the swivel member within the partial spherical opening may be performed via adjustment of a single fastener.

Because the bracket or mounting block of the present invention may be unitarily formed or a unitary bracket or mounting block, manufacturing and assembly processes of the bracket assembly or mounting block assembly may be reduced. Additionally, the lateral dimensions of the unitary bracket of the present invention, and thus the material required to make the bracket, may be reduced, because each fastener is positioned generally adjacent to the respective opening in the bracket and does not extend laterally outwardly of an outermost diameter of the bracket at which the bracket engages and retains the gripper assembly.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. A mounting assembly for adjustably receiving a support structure, said mounting assembly comprising:
　a mounting member having an opening at least partially therethrough, said opening defining an inner surface;
　a swivel member having a generally cylindrical passageway therethrough for at least partially receiving the support structure, said swivel member comprising a truncated generally spherical shaped swivel member, having a curved outer surface for engaging said inner surface of said opening of said mounting member, said swivel member comprising a split member with a gap extending therealong, said outer surface of said swivel member including a reduced diameter portion adjacent to said gap to facilitate insertion of said swivel member into said opening of said mounting member, said reduced diameter portion comprising a chamfer on said outer surface adjacent to said gap, whereby said inner surface of said opening is configured to substantially retain said swivel member within said opening after insertion of said swivel member into said opening.

2. The mounting assembly of claim 1, wherein said mounting member defines a second gap at said opening, a diameter of said opening being adjustable via compression and expansion of said second gap.

3. The mounting assembly of claim 2 including an adjustable fastener generally at said opening, said fastener being adjustable to adjust a clamping force of said swivel member on the support structure received at least partially through said passageway via expansion or compression of said gap and said second gap.

4. The mounting assembly of claim 1, wherein said swivel member includes a plurality of grooves extending along said outer surface, said grooves enhancing gripping of said swivel member within said opening.

5. The mounting assembly of claim 1, wherein said mounting member includes a beveled portion around said opening.

6. The mounting assembly of claim 1, wherein said mounting member comprises a mounting bracket for mounting a workpiece holder to a support structure.

7. The mounting assembly of claim 6, wherein said mounting member defines a second opening for at least partially receiving a mounting portion of the workpiece holder.

8. The mounting assembly of claim 7, wherein said mounting member defines a first gap at said opening and a second gap at said second opening, a clamping force at said opening and said second opening being adjustable via compression and expansion of said first and second gaps.

9. The mounting assembly of claim 8, wherein said mounting member comprises a unitary mounting bracket.

10. The mounting assembly of claim 1, wherein said mounting member comprises a rear mounting block for a workpiece holder and is configured to mount to a portion of the workpiece holder, said swivel member being configured to at least partially receive the support structure to adjustably mount the workpiece holder at the support structure.

11. The mounting assembly of claim 10, wherein said mounting member defines a gap at said opening, a clamping force at said opening being adjustable via compression and expansion of said gap.

12. The mounting assembly of claim 11, wherein said mounting member comprises a unitary mounting block.

13. The mounting assembly of claim 1, wherein said inner surface of said opening comprises a curved surface having an arcuate cross section for engaging said outer surface of said swivel member when said swivel member is inserted into said opening.

14. The mounting assembly of claim 1, wherein said mounting member comprises a unitary mounting member.

15. A workpiece holder mounting assembly for mounting a workpiece holder to a support structure, said mounting assembly comprising:
 a bracket member defining a first generally circular opening for receiving a mounting portion of the workpiece holder at least partially therethrough and a second opening for adjustably receiving the support structure at least partially therethrough;
 a swivel member configured to be adjustably received in said second opening, said swivel member comprising a truncated generally spherical shaped swivel member having a curved outer surface for engaging an inner surface of said second opening, said swivel member comprising a split member having a gap between opposed ends of said swivel member, said swivel member defining a passageway therethrough for receiving the support structure, said swivel member comprising a reduced diameter portion of said curved outer surface adjacent to said gap to facilitate insertion of said swivel member into said second opening of said bracket member, said reduced diameter portion comprising a chamfer at said outer surface of one of said opposed ends, whereby said inner surface of said second opening is configured to substantially retain said swivel member within said second opening after insertion of said swivel member into said second opening.

16. The mounting assembly of claim 15, wherein said, a clamping force of said swivel member on a structure received at least partially through said passageway is adjustable via expansion or compression of said gap.

17. The mounting assembly of claim 15, wherein said bracket member comprises a unitary bracket member.

18. The mounting assembly of claim 15, wherein said bracket member defines a first gap at said first opening, a diameter of said first opening being adjustable via compression and expansion of said first gap.

19. The mounting assembly of claim 18, wherein said bracket member defines a second gap at said second opening, a diameter of said second opening being adjustable via compression and expansion of said second gap.

20. The mounting assembly of claim 19 including a first adjustable fastener generally at said first opening and a second adjustable fastener generally at said second opening, said first and second fasteners being adjustable to independently adjust a clamping force of said bracket member at a respective one of said first and second openings.

21. The mounting assembly of claim 20, wherein said bracket member comprises a unitary bracket member.

22. The mounting assembly of claim 15, wherein said bracket member comprises a unitary bracket member.

23. The mounting assembly of claim 15, wherein said bracket member includes a beveled portion around said second opening.

* * * * *

UNITED STATES PATENT AND TRADEMARK OFFICE
CERTIFICATE OF CORRECTION

PATENT NO. : 6,988,696 B2 Page 1 of 1
APPLICATION NO. : 10/453741
DATED : January 24, 2006
INVENTOR(S) : Keith S. Attee It is certified that error appears in the above-identified patent and that said Letters Patent is hereby corrected as shown below:

Column 12
Claim 16, Line 5, "claim 15, wherein said a" should be --claim 15, wherein a--

Signed and Sealed this

Third Day of February, 2009

JOHN DOLL
*Acting Director of the United States Patent and Trademark Office*